United States Patent [19]

Steigerwald

[11] 4,039,926
[45] Aug. 2, 1977

[54] CURRENT FED INVERTER WITH COMMUTATION INDEPENDENT OF LOAD INDUCTANCE

[75] Inventor: Robert L. Steigerwald, Scotia, N.Y.

[73] Assignee: General Electric Company, Schenectady, N.Y.

[21] Appl. No.: 698,000

[22] Filed: June 21, 1976

[51] Int. Cl.² .................................... H02M 7/515
[52] U.S. Cl. ................................. 363/138; 323/102
[58] Field of Search ................. 321/12, 45 R, 45 C; 318/341, 345, 227; 323/101, 102

[56] References Cited

U.S. PATENT DOCUMENTS

| 3,624,476 | 11/1971 | Bruscaglioni et al. | 321/45 C |
| 3,924,173 | 12/1975 | Goswami | 321/45 C |
| 3,935,528 | 1/1976 | Brenneisen et al. | 321/45 C |

FOREIGN PATENT DOCUMENTS

| 2,433,825 | 1/1976 | Germany | 323/102 |

OTHER PUBLICATIONS

*High Voltage Direct Current Power Transmission*, By C. Adamson and N. G. Hingorani, Garraway Ltd. 1960, pp. 121-123.

Primary Examiner—Gerald Goldberg
Attorney, Agent, or Firm—Donald R. Campbell; Joseph T. Cohen; Jerome C. Squillaro

[57] ABSTRACT

A three phase bridge inverter supplies rectangular wave currents to an inductive load and to capacitors connected in wye across the load for wave shaping as well as filtering and power factor correction. A commutating capacitor connected to the midpoint of the wye-connected capacitors is controlled by two auxiliary thyristors. The commutating capacitor voltage is sensed and an incoming thyristor is not fired until the voltage rises to a level sufficient to commutate the next thyristor in sequence. This commutation is independent of load inductance.

7 Claims, 3 Drawing Figures

CURRENT FED INVERTER WITH COMMUTATION INDEPENDENT OF LOAD INDUCTANCE

BACKGROUND OF THE INVENTION

This invention relates to current fed inverters, and more particularly to a thyristor current fed inverter with commutation independent of load inductance having a variety of applications.

In some circuits with current fed inverters, which are also known as controlled-current inverters, load capacitors are used to obtain a leading power factor and provide a source of commutating voltage for the inverter SCR's. Viewed in another way, the tank circuit formed by the paralleled load and load capacitors permits natural commutation of the inverter. This type of inverter requires relatively large load capacitors to maintain commutation. A circuit that realizes a forced commutation of an inverter built with mercury are rectifiers is described in the book "High Voltage Direct Current Power Transmission" by C. Adamson and N. G. Hingorani, Garraway Ltd., London, England, copyright 1960, pages 121–123. In addition to the normal three phase bridge, this HVDC inverter further consists of a pair of auxiliary valves and a commutating capacitor located between the midpoint of the auxiliary valves and the neutral of a wye-connected output transformer winding. One of the auxiliary valves is fired to turn off a conducting main valve. However, since the commutating capacitor is connected to the load midpoint, the inductance of the load influences the commutation time and capacitor voltage magnitude. Also, the commutating voltage spikes are applied to the load. The principal object of the present invention is to attain reliable commutation in a current fed inverter which is independent of the valve of load inductance and relatively simple to implement.

SUMMARY OF THE INVENTION

A polyphase current fed or controlled-current bridge inverter as herein taught has various applications including a constant speed ac motor drive, high voltage direct current transmission, or as a dc-to-ac power supply for wave shaping. The exemplary embodiment is a three phase bridge inverter using thyristors, specifically pairs of series-connected silicon controlled rectifiers, that is energized by a current source and supplies rectangular wave currents to the output terminals. An inductive load and star-connected or wye-connected capacitors are in parallel between the output terminals, with the value of these capacitors being selected to resonate with the load at a desired frequency near which the inverter is operated. The wye-connected capacitors have a wave shaping function, since the load voltage ideally is sinusoidal, as well as providing voltage limiting and power factor correction, although it is not necessary that the wye-connected capacitors be large enough to provide a leading power factor.

To enable the main thyristors to commutate reliably independent of load inductance, a commutating capacitor is connected directly between the junction of a pair of auxiliary thyristors and the midpoint of the wye-connected capacitors. Assuming that the commutating capacitor is properly charged by the previous operation, commutation is initiated by firing an auxiliary thyristor to turn off the outgoing main thyristor. Capacitor voltage sensor means are provided for sensing at least the commutating capacitor voltage and producing a control circuit enabling signal when the voltage rises to a magnitude of the other polarity sufficient to assure commutation. The control circuit for generating thyristor turn-on signals is responsive to the enabling signal, with the result that the incoming main thyristor is not rendered conductive until the commutating capacitor voltage has reached a preset level or at least is greater than the voltage across the respective wye-connected capacitor and main thyristor being commutated. Thus, the commutating capacitor voltage is easily controlled and the commutating ability of the inverter is assured.

DESCRIPTION OF THE PREFERRED EMBODIMENT

Figure 1:
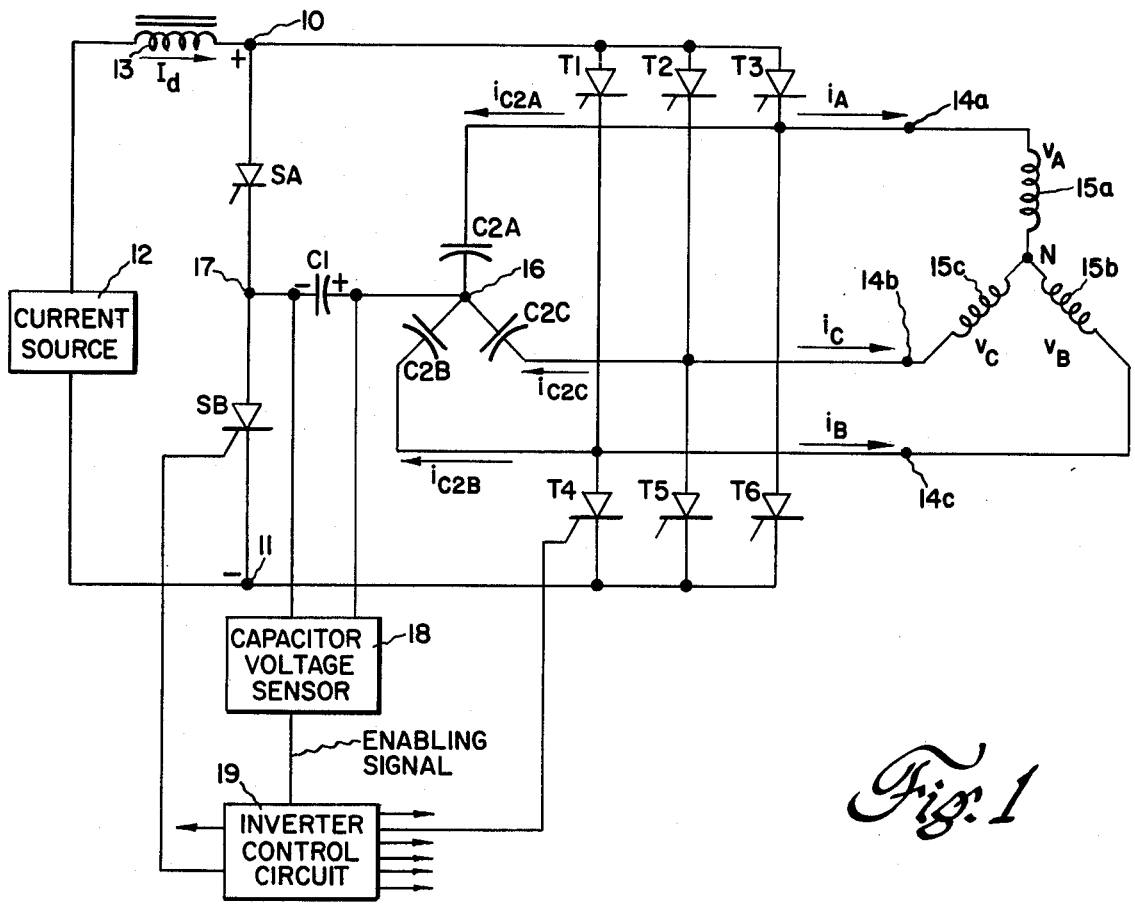
FIG. 1 is a schematic circuit diagram of a power converter with a thyristor current-fed inverter constructed as herein taught to achieve reliable commutation independent of the value of load inductance.

The SCR current fed inverter in FIG. 1 is a three phase bridge inverter using six main thyristors T1–T6. The three inverter legs each include a pair of series connected, alternately conductive main thyristors coupled between a pair of direct current input terminals 10 and 11. The inverter is energized by a current source 12 which commonly includes a smoothing inductor 13 at positive input terminal 10. Many types of current sources can be used in the practice of the invention to supply fixed or adjustable magnitude unidirectional current, such as a phase controlled rectifier with a smoothing inductor at the output, a battery with a smoothing inductor, and others depending on the application. An output terminal 14a is defined at the junction between the pair of main thyristors T3 and T6, and similarly output terminal 14b at the junction of T2 and T5 and output terminal 14c at the junction of T1 and T4. A wye-connected inductive load with windings 15a, 15b, and 15c and a neutral point N is illustrated, but the inverter can also be used with a delta-connected three phase inductive load.

Wye-connected or star-connected capacitors C2A, C2B, and C2C are connected in parallel with the load between the respective output terminals 14a, 14b, and 14c. Assuming a balanced load, the midpoint 16 of the wye-connected capacitors C2 is at the neutral potential. The capacitance value of the wye-connected capacitors is selected to resonate with the paralleled load at a desired frequency, and when the tank circuit formed by capacitors C2 and the load inductance is excited relatively near its resonance, the load voltage is maintained approximately sinusoidal. Thus, the wye-connected capacitor bank provides wave shaping, as well as power factor correction and limiting voltage transients during the switching of current from one phase to the next. In this inverter circuit the capacitors C2 do not have to be large enough to obtain a leading load power factor since commutation of the main thyristors is achieved by a commutating capacitor C1 and a pair of auxiliary thyristors SA and SB. However, wye-connected capacitors C2 are substantially larger than commutating capacitor C1 as will be evident from the operation. The alternately conductive auxiliary thyristors SA and SB are also connected in series between input terminals 10 and 11, and commutating capacitor C1 is connected directly between the junction 17 of the two auxiliary thyristors and the midpoint 16 of wye-connector capacitors C2.

Figure 2:
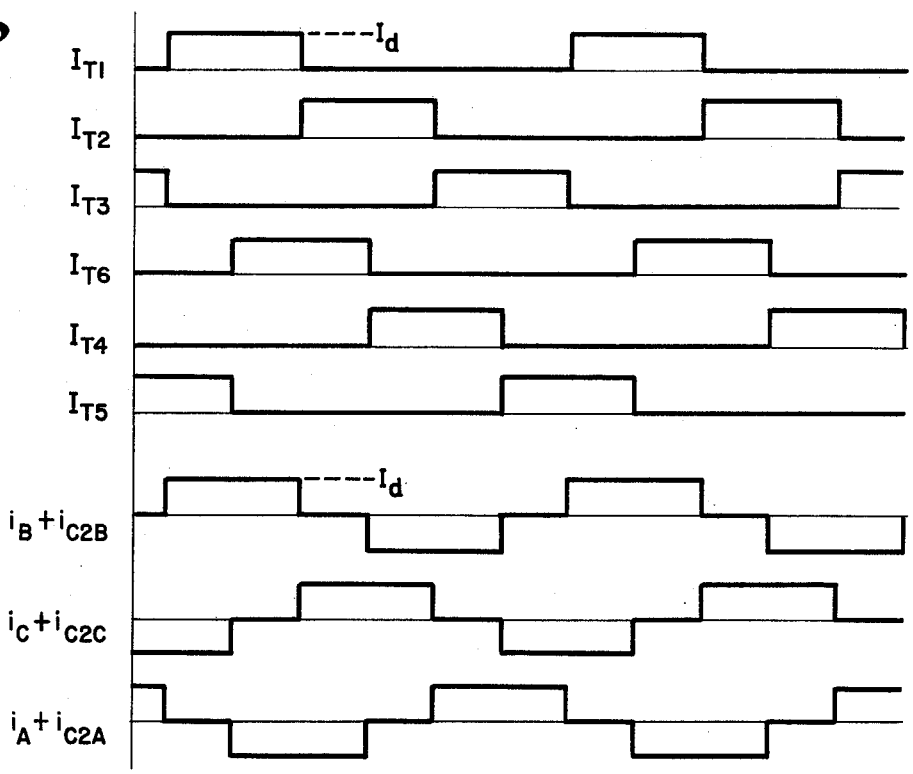
FIG. 2 is a series of current waveform diagrams used to explain operation of the inverter.
Figure 3:
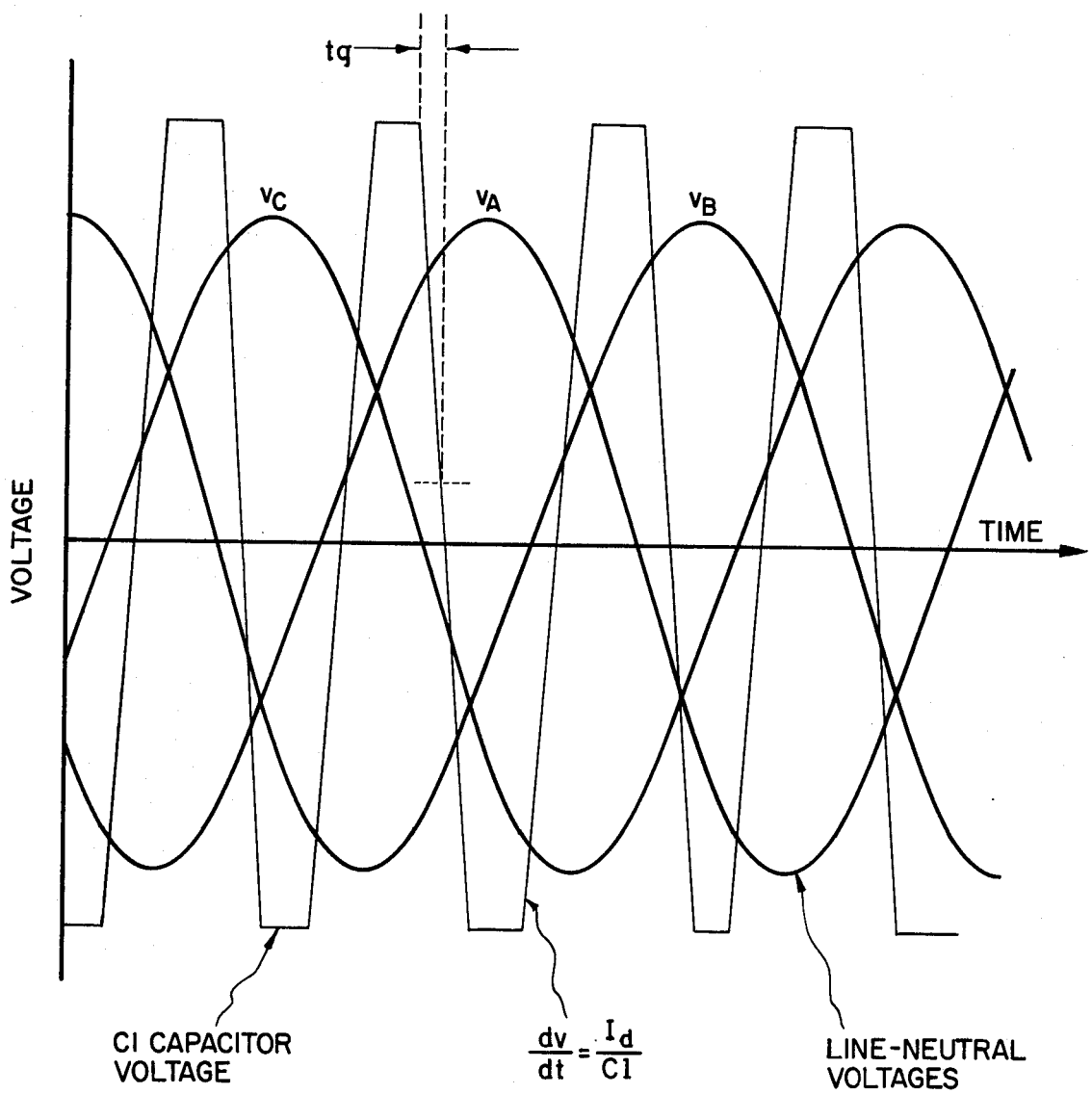
FIG. 3 is a voltage waveform diagram of the commutating capacitor voltage and line-to-neutral output voltages.

The sequence of switching currents in main thyristors T1-T6 is given in the upper part of FIG. 2. As was previously mentioned, the inverter operating frequency is near the tank resonant frequency, and rectangular current waves of 120° duration are fed to the load-capacitor combination. As is conventional in this type of bridge inverter, thyristors T1, T2, and T3 connected to the positive bus are conductive in sequence, and the input current $I_d$ is switched from one of these outgoing main thyristors to the next incoming main thyristor. Similarly, the other three thyristors T4, T5, and T6 connected to the negative bus are also conductive in sequence, but the intervals of conduction of this negative group are 60° phase displaced with respect to the intervals of conduction of the positive group. Thus, commutation of conducting main thyristors occurs at 60° intervals, alternating to turn off a device in the positive group and then a device in the negative group, and so on. The three-phase rectangular wave currents generated by the inverter and applied to the capacitor-load combination are shown at the bottom of FIG. 2. Referring to FIG. 3, the line-neutral or single phase load voltages $v_A$, $v_B$, and $v_C$ ideally have a sinusodial waveform. As will be recognized by those skilled in the art, the load voltage waveforms are somewhat distorted by exciting the load-capacitor C2 tank circuit with rectangular current waves.

The voltage to which commutating capacitor C1 is charged prior to the commutating interval is controllable and further is sufficiently high to assure reliable commutation. To this end, capacitor voltage sensor means 18 is provided for sensing the voltage across the commutating capacitor and producing a control circuit enabling signal when the voltage rises to a preset level or is of sufficient magnitude to effect commutation. The selected voltage sensor generates a signal indicative of the instantaneous commutating capacitor voltage. In the preferred form of sensor means 18, the control circuit enabling signal is produced at a specified dc voltage level, for example 800 volts, and a comparator can be used for this purpose. Another possible implementation is to continuously sense the voltage across commutating capacitor C1 and wye-connected capacitors C2, and compute, using the appropriate equations, the minimum voltage needed for commutation. This will be clarified by the discussion of the operation. Inverter control circuit 19 supplies turn-on signals to render conductive the main thyristors in a prescribed sequence and for alternately rendering conductive the auxiliary thyristors to initiate commutation. Control circuit means 19 is of conventional construction with the exception that the presence of the enabling signal from capacitor voltage sensor means 18 is required in order to transmit a gating signal to main thyristors T1 to T6. For instance, AND logic circuitry can be used having as one input the enabling signal and as the other input the respective normal gating signal.

To explain operation of the current fed inverter during commutation, consider the commutation of current from main thyristor T2 to main thyristor T3. It is assumed that commutating capacitor C1 is charged with its right-hand plate positive as the result of the previous operaton. It is also assumed that the wye-connected capacitor voltage, in particular the voltage across capacitor C2C, is approximately sinusoidal, and that capacitors C2 are sufficiently large that their voltages do not change during a commutation. To turn off T2, auxiliary thyristor SA is fired and thus the reverse voltage on commutating capacitor C1 is applied through C2C to T2, turning it off immediately. The commutating capacitor voltage is controlled so that it is initially higher than the voltage across capacitor C2C for all conditions. Consequently, main thyristor T2 is turned off immediately. In general, the commutating capacitor voltage at least exceeds the voltage across the respective wye-connected capacitor in series with the commutating capacitor and the selected main thyristor to be commutated. For this particular case, regardless as to the polarity and magnitude of the voltage on capacitor C2C, the voltage on capacitor C1 is greater with a polarity to reverse bias the outgoing main thyristor.

With main thyristor T2 commutated off, the entire dc current $I_d$ is in auxiliary thyristor SA, C1, and the load-capacitor combination returning through main thyristor T4 to the dc supply. Commutating capacitor C1 thus reverses its charge linearly with time (see FIG. 3) and the turn-off time $t_q$ for the outgoing main thyristor ends when the rapidly falling instantaneous commutating capacitor voltage is equal to the voltage on C2C. The equation for the rate of change of commutating capacitor voltage is given in FIG. 3. As capacitor C1 continues to reverse its charge linearly, the incoming main thyristor T3 is forward biased as soon as its voltage becomes greater than the voltage across capacitor C2A. However, main thyristor T3 is not yet fired until the commutating capacitor charges to a predetermined higher voltage sufficient to assure commutation. As was previously explained, capacitor voltage sensor means 18 senses the rising capacitor voltage and generates the control circuit enabling signal upon reaching a present level. When the desired voltage on C1 is reached, inverter control circiut 19 transmits a gating signal to main thyristor T3, rendering it conductive. The firing of thyristor T3 immediately turns off auxiliary thyristor SA since the left-hand plate of commutating capacitor C1 is now positive, and the total current $I_d$ switches to the incoming main thyristor T3. Thus, the voltage increase on capacitor C1 has been immediately terminated and the commutating capacitor has the desired voltage magnitude and polarity needed for the next commutation. The next commutation in sequence is from main thyristor T4 to main thyristor T5, and commutation in this case is initiated by turning on the other auxiliary thyristor SB.

To summarize, the advantages of the thyristor current fed inverter which has been described will be reviewed. The main advantage is that commutation takes place independent of the load inductance. The voltage on commutating capacitor C1 is actively controlled in a simple manner thereby assuring the commutation ability of the inverter. Large commutation spikes do not appear at the inverter output since wye-connected capacitors C2 provide filtering action. The wye-connected capacitor do not have to provide a leading load power factor in order to maintain inverter commutation. Thus, load changes or frequency changes do not affect the commutating ability of the inverter. Wye-connected capacitors C2 do, however, provide some power factor correction, thereby decreasing the inverter requirements. Although a balanced load has been assumed in the discussion, the inverter can include provision for unbalanced loads, such as using unequal individual wye-connected capacitors or by using reactive load control.

This current fed or controlled current inverter with reliable commutation independent of load inductance has many applications including ac motor drives, for operation over a defined speed range, high voltage direct current transmission, power supplies for wave shaping, or in general wherever dc power needs to be converted to ac power. For the HVDC transmission application, the load inductance is the ac system line inductance. Although a three phase inverter has been discussed, the invention is applicable to other polyphase inverters such as a six phase inverter.

While the invention has been particularly shown and described with reference to a preferred embodiment thereof, it will be understood by those skilled in the art that various changes in form and details may be made therein without departing from the spirit and scope of the invention.

The invention claimed is:

1. A current fed polyphase bridge inverter for energization by a current source comprising
   a plurality of pairs of alternately conductive main thyristors and a single pair of alternately conductive auxiliary thyristors each coupled between a pair of direct current input terminals, said pairs of main thyristors respectively having an output terminal between the thyristors in each pair,
   star-connected capacitors respectively coupled between the midpoint thereof and one of said output terminals,
   a commutating capacitor connected directly between the junction of said auxiliary thyristors and the midpoint of said star-connected capacitors,
   capacitor voltage sensor means for sensing at least the voltage across said commutating capacitor and producing a control circuit enabling signal when the commutating capacitor voltage rises to a magnitude of either polarity sufficient to assure commutation, and
   control circuit means responsive to said enabling signal for rendering conductive said main thyristors in a prescribed sequence and for rendering conductive said auxiliary thyristors alternately to initiate commutation of a selected main thyristor, to thereby generate rectangular wave currents at said output terminals.

2. The current-fed inverter according to claim 1 wherein said capacitor voltage sensor means produces the control circuit enabling signal at a value of the commutating capacitor voltage which at least exceeds the voltage across the respective star-connected capacitor in series with said commutating capacitor and the selected main thyristor to be commutated.

3. The current-fed inverter according to claim 1 wherein there are only three pairs of main thyristors and output terminals defining a three phase bridge inverter, and said main and auxiliary thyristors are silicon-controlled rectifiers, and
   the commutating capacitor voltage at which the control circuit enabling signal is produced by said capacitor voltage sensor means is a preset voltage level having a magnitude greater than the voltage across the respective star-connected capacitor in series with said commutating capacitor and the selected main thyristor to be commutated.

4. A current fed three phase bridge inverter for energization by a current source comprising
   a plurality of pairs of alternately conductive main thyristors and a single pair of alternately conductive auxiliary thyristors each coupled between a pair of direct current input terminals, said pairs of main thyristors respectively having an output terminal between the thyristors in each pair,
   wye-connected capacitors and a three phase inductive load connected in parallel between said output terminals, said wye-connected capacitors having a midpoint and a capacitance value selected to resonate with said load at a desired frequency,
   a commutation capacitor connected directly between the junction of said auxiliary thyristors and the midpoint of said wye-connected capacitors,
   capacitor voltage sensor means for sensing the voltage across said commutating capacitor and producing a control circuit enabling signal when the commutating capacitor voltage rises to a magnitude of either polarity sufficient to assure commutation, and
   control circuit means responsive to said enabling signal for rendering conductive said main thyristors in a prescribed sequence and for rendering conductive said auxiliary thyristors alternately to initiate commutation of a selected main thyristor, to thereby generate rectangular wave currents at said output terminals applied to the load and wye-connected capacitors.

5. The current-fed inverter according to claim 4 wherein said capacitor voltage sensor means produces the control circuit enabling voltage at a value of the commutating capacitor voltage which at least exceeds the voltage across the respective wye-connected capacitor in series with said commutating capacitor and the selected main thyristor to be commutated.

6. The current-fed inverter according to claim 4 wherein said main and auxiliary thyristors are silicon controlled rectifiers, and
   the commutating capacitor voltage at which the control circuit enabling signals is produced by said capacitor voltage sensor means is a preset voltage level having a magnitude greater than the voltage across the respective wye-connected capacitor in series with said commutating capacitor and the selected main thyristor to be commutated.

7. The current-fed inverter according to claim 4 wherein said control circuit means more particularly is sequentially operative to render conductive one of said main thyristors which in turn is effective to commutate off a conducting auxiliary thyristor.

* * * * *